Jan. 13, 1948.  F. E. FREY  2,434,403
PROCESS FOR PRODUCING CYCLOPENTADIENE
Filed Dec. 26, 1945
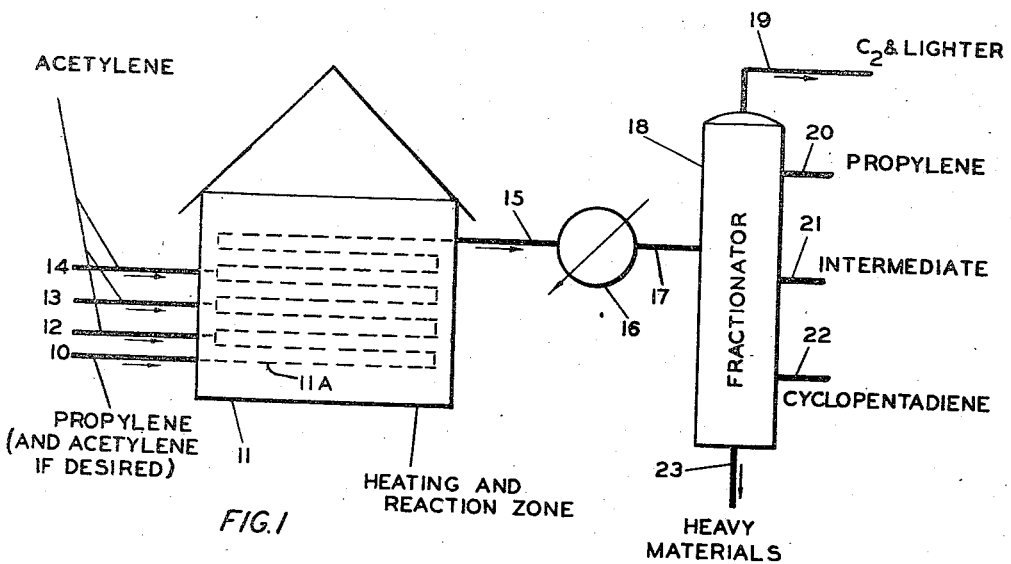
FIG. 1
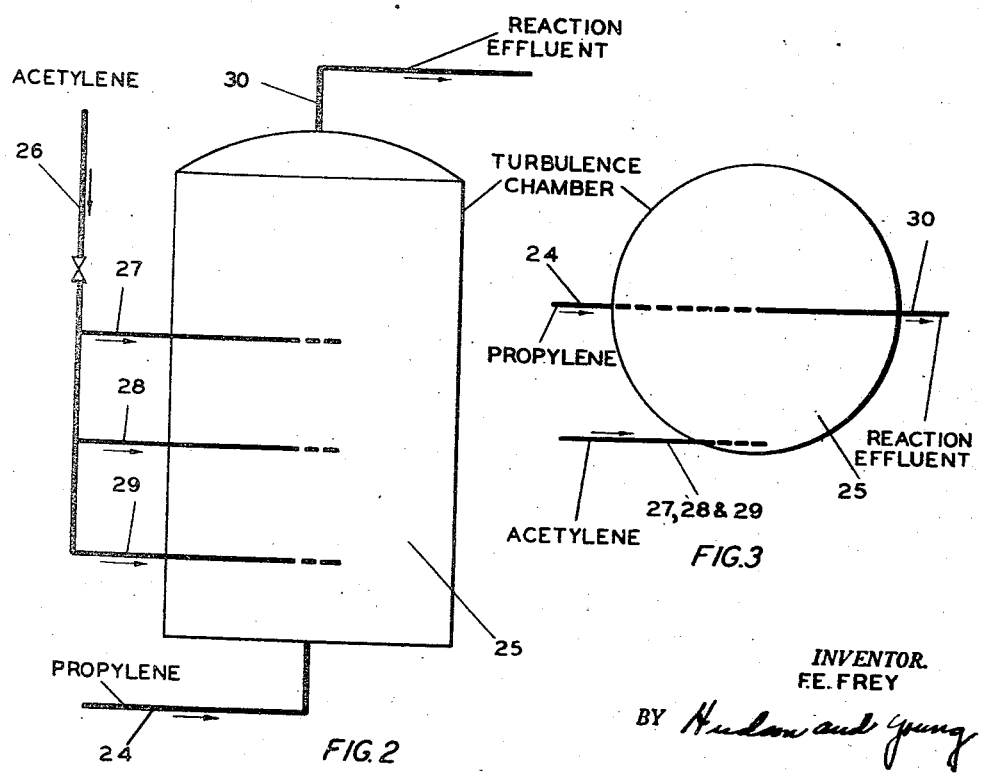
FIG. 2
FIG. 3
INVENTOR.
F.E. FREY
BY Hudson and Young
ATTORNEYS Patented Jan. 13, 1948

2,434,403

UNITED STATES PATENT OFFICE 2,434,403

PROCESS FOR PRODUCING CYCLO-PENTADIENE

Frederick E. Frey, Bartlesville, Okla., assignor to Phillips Petroleum Company, a corporation of Delaware Application December 26, 1945, Serial No. 637,167

5 Claims. (Cl. 260—666)

This invention relates to hydrocarbon conversion. More particularly it relates to the production of cyclopentadiene from propylene and acetylene.

Cyclopentadiene, as such, or in the form of some of its simpler polymers, is a valuable hydrocarbon. Being a very reactive compound it is useful as an intermediate in numerous organic syntheses. By thermal or catalytic polymerization it may be converted to many useful resinous products such as coating materials, synthetic rubbers, drying oils, and the like. Many of the present and potential industrial uses of this compound have been described in a recent review of the chemistry of this diolefin (Wilson and Wells, Chem. Rev. 34, 3, 1944).

For the most part, cyclopentadiene is produced commercially as a byproduct from the manufacture of benzene from coal tar distillation or as a byproduct from the thermal pyrolysis of paraffinic or naphthenic hydrocarbons. The yield of cyclopentadiene is low in both of these processes.

In the case of coal-tar-derived cyclopentadiene, sulfur compounds are recovered along with the diene. These can be removed only with considerable difficulty. Sulfur-containing impurities impart objectionable characteristics to many of the commercial end products of cyclopentadiene utilization. Since I use hydrocarbons which are free from sulfur and sulfur compounds, the product cyclopentadiene is free from sulfur.

The principal object of the present invention is to provide a method of synthesizing cyclopentadiene from propylene and acetylene. Another object is to provide such a process which yields cyclopentadiene which is completely free from sulfur compounds and therefore does not need to be especially treated for their removal. Another object is to provide a process of the foregoing type which involves minimum losses of propylene and acetylene in the form of by-products, coke and the like. Many other objects will be apparent to those skilled in the art from the following description.

In the accompanying drawings:

Fig. 1 is a diagrammatic illustration of one arrangement of equipment which may be used in carrying out the process of the present invention.

Figs. 2 and 3 are front and top views respectively of an alternate reaction vessel which may be used in place of that shown in Fig. 1. This type of reactor is termed in the art a turbulence chamber.

I have discovered that cyclopentadiene can be produced by thermal treatment of mixtures of acetylene and propylene. Cyclopentadiene formation occurs in the absence of catalysts at temperatures between 1000° F. and 1600° F. The more favorable range is 1200° F. to 1500° F. Catalysts however are sometimes helpful and may enable the reaction to be conducted at lower temperatures. While my process is broadly a thermal one, either catalytic or non-catalytic, ordinarily it is carried out non-catalytically.

It is preferred to operate the process of the invention at pressures ranging from slightly below to substantially above atmospheric pressure. The preferred range is 0.5 to 20 atmospheres. Excessive pressure is undesirable since there are certain pressure limitations on the safe handling of acetylene and cyclopentadiene. Furthermore, undesirable side reactions such as the polymerization of acetylene and of propylene are favored by increased pressure. The practical upper limit of usable pressure is set only by the safety factors mentioned and the incidence of these undesirable side reactions. Ordinarily I employ atmospheric pressure or a pressure just sufficiently above atmospheric to induce flow through the reaction zone in continuous operation.

The residence time in the reaction zone of the hydrocarbon feed should be regulated so that reasonably efficient utilization of the feed is obtained. The reaction time is preferred to be such that if propylene alone were charged to the reactor at a given temperature, only a small proportion of the propylene (2–10 per cent by weight) would be pyrolyzed.

The residence will depend upon other conditions, namely, temperature proportions of acetylene and propylene, pressure, etc. In general it will range from 0.1 to 10 seconds. These figures refer to the average residence time of the reactants in the reaction chamber. The preferred range is from 0.3 to 0.75 second. At a temperature of approximately 1400° F., atmospheric pressure and with a molar ratio of propylene to acetylene of from 15:1 to 20:1 a preferred contact time is 0.5 second. The propylene and the entire amount of acetylene which is to be employed may be charged in admixture to the reaction zone. In such case the molar ratio of propylene to acetylene in the charge should be at least 9:1 and preferably at least 15:1. This molar ratio may be as high as 25:1 but ordinarily ratios above 25:1 will be uneconomical because of the small extent of reaction obtained. Use of acetylene in an amount greater than that represented by the molar ratio of propylene to acetylene of 9:1 is ordinarily undesirable because losses of valuable acetylene by unwanted side reactions become excessive. In certain cases, however, especially when the reaction is conducted in a turbulence chamber, overall molar ratios somewhat less than 9:1 may be used, since, as a result of rapid mixing, local molar ratios will actually be higher than 9:1.

In many cases it may be desirable to introduce all of the propylene at the initial point of the reaction zone and to introduce the acetylene multipointwise along the path of flow. For example, when a tubular reaction zone of restricted cross-sectional area such that flow is confined to substantially one general direction from one end thereof to the other is employed the propylene may be injected at the inlet end, with or without a small proportion of the total acetylene to be charged, and the balance of the acetylene introduced at a plurality of points along the tube. In this way reaction between acetylene and propylene is favored while reactions involving only acetylene or only propylene are minimized. In some cases it may be desirable to introduce the first increment of acetylene at a point substantially removed from but generally adjacent to the beginning of the tube so that the propylene charged is brought up to the reaction temperature before any acetylene is introduced thereto for reaction purposes.

To keep undesirable side reactions at a minimum it is preferred to maintain the concentration of free acetylene at all points in the reaction zone at a suitably low level, i. e., below 6 mol per cent and preferably below 3 mol per cent of the reaction mixture. This may be accomplished by multipoint injection of the acetylene in the manner just described or in any other suitable manner, for example, by the use of a turbulence chamber as described more fully below.

The reaction is almost invariably conducted in a continuous manner, with continuous introduction of reactant hydrocarbons to the reaction zone and continuous withdrawal of reaction effluent which may be cooled and passed to a suitable recovery system for the recovery of product cyclopentadiene and unreacted propylene and other hydrocarbons produced by side reactions. Unreacted acetylene and propylene may be recovered from the effluent in any suitable manner for recycle to the reactor. However it is to be understood that discontinuous or batch operation is comprehended within the invention in its broader aspects.

It will be understood that reaction conditions are such that all of the reactants remain in the gas or vapor phase. The products likewise are in the gaseous state with the possible exception of any small amounts of tar or coke which may be formed.

Instead of using a tubular reaction zone of relatively small diameter as described above, I may employ a so-called turbulence chamber which may conveniently take the form of a relatively large cylindrical vessel to one end of which the preheated propylene or propylene concentrate is introduced in any suitable manner. The acetylene may be introduced in a plurality of streams injected tangentially and at right angles to the longitudinal axis of the chamber. The turbulence chamber is kept heated to the reaction temperature in any suitable manner as for example by surrounding it with hot combustion gases. Vigorous turbulent circulation of the reaction mixture within the chamber is established and maintained by introducing the hydrocarbon streams at a high linear velocity and in a suitable direction and manner. Rapid mixing and dilution of the incoming hydrocarbons with the already present circulating and reacting contents of the chamber is thereby effected. In this way the coreaction of propylene and acetylene to form cyclopentadiene is favored and the formation of polymers of propylene and/or acetylene is minimized. The resulting reacted mixture may be withdrawn from the opposite end of the chamber. Under the conditions employed no short-circuiting of reactants from the points of entry to the exit point takes place.

This invention can be practiced using steam as a diluent to maintain low hydrocarbon partial pressures, if desired, and to minimize carbon formation in the reaction zone. Thus steam may be present in amount such as to reduce the partial pressure of the hydrocarbons to one-fourth of an atmosphere as a lower limit. Also, quenching or quick cooling of the reactor effluents is desirable to avoid cyclopentadiene loss.

The following description illustrates several methods of practicing this invention. Referring to Fig. 1, a mixture of propylene and acetylene is charged through line 10 to heater 11 where the mixture is heated in coil 11a. The conditions of pressure, reaction time and temperature in this coil have been previously defined within certain favored limits. The hydrocarbon mixture charged should not contain acetylene in excess of a molar ratio of 1:9 compared to propylene. Alternatively propylene or a propylene concentrate may be charged through pipe 10 and acetylene added portionwise at three or more points along the coil, e. g., through lines 12, 13, and 14. A greater or lesser number of acetylene injection points may be used, if so desired, however. Instead of pure acetylene, an acetylene-containing stream, produced by high-temperature pyrolysis or by electrical decomposition of hydrocarbons may be introduced through lines 12, 13, and 14, or through pipe 10 in admixture with the proper amount of propylene, without prior concentration of the acetylene.

Unchanged reactants and reaction products are removed from the coil through line 15 to cooler 16, thence through line 17 to fractionating means 18. The C₂ and lighter gases are removed through line 19 to suitable disposal. If desired, these gases may be treated by some suitable means, as solvent extraction, to recover acetylene for recycling to the reaction zone. Propylene is removed through line 20 and may be recycled to the reaction zone. Materials boiling between cyclopentadiene and propylene are removed through line 21. Cyclopentadiene is removed through line 22 to storage. Very high-boiling by-products of the process are removed through line 23.

In Fig. 2, hot propylene from a source not shown is conducted through line 24 to turbulence chamber 25. Hot flue gases flowing past the outer surface of the vessel are used to maintain the reactor at reaction temperature. Acetylene or acetylene-containing gas is conducted from a source not shown through line 26 to pipes 27, 28, and 29. The acetylene is proportioned to these pipes and introduced at high velocity to turbulence chamber 25. The acetylene-propylene ratio, the temperature, the pressure, and the reaction time in the reaction zone are all kept within the previously defined favorable limits.

The reaction mixture is withdrawn from the chamber through line 30, is cooled, and fractionated as illustrated in Figure 1.

Figure 3 shows the method of maintaining high turbulence of the gases in the reaction chamber. The acetylene enters chamber 25 through pipes 27, 28, and 29 as previously described. The acetylene enters tangentially to the curved surface of the chamber. Its high velocity causes the gases therein to swirl about within the chamber. This type of highly turbulent flow gives good mixing of the gases in the reaction zone.

Steam dilution may be employed in a reactor such as that shown by Figures 2 and 3 to minimize carbon deposition and maintain low partial pressures of the reactants.

The turbulence chamber 25 may also be operated by introduction of a mixture of propylene and acetylene through pipe 24. In this case, the hydrocarbon feed is introduced through a jet at the end of pipe 24 which is so sized and positioned that the charge enters at high velocity and promotes high turbulence within the chamber. The high turbulence within the chamber and the high velocity of the entering charge promotes rapid dilution of the charge with the hot gases within the chamber, thus keeping the acetylene at low concentration.

*Example*

There follows a description of a specific embodiment of the present invention and of a comparative experiment made with propylene only.

An experiment was made in which a propylene-acetylene mixture was subjected to elevated temperature in a quartz turbulence chamber. A second experiment was performed under substantially the same conditions in which propylene alone was charged to the reactor. Data from these experiments are given below.

| Conditions | Experiment 1 | Experiment 2 |
|---|---|---|
| Temperature, °F | 1,402 | 1,405 |
| Residence Time in Reactor, sec | 0.50 | 0.52 |
| Time of experiment, min | 140 | 165 |
| Mole per cent $C_3H_6$ in Charge | 94.63 | 100.0 |
| Mole per cent $C_2H_2$ in Charge | 5.37 | 0.0 |
| Molar Ratio of $C_3H_6$ to $C_2H_2$ | 17.62 | |
| Pressure | (1) | (1) |

1 Atmospheric.

Analyses of the reactor effluents were as follows:

| | Experiment 1 weight per cent | Experiment 2 weight per cent |
|---|---|---|
| $C_3$ and lighter | 93.432 | 95.474 |
| $C_4$'s | 1.548 | 1.513 |
| Cyclopentadiene | 1.365 | 0.136 |
| Other $C_5$'s | 0.844 | 0.438 |
| $C_6$'s | 1.287 | 1.062 |
| $C_7$ | 1.524 | 1.377 |
| | 100.000 | 100.000 |

Analyses of $C_4$ and heavier products show the following distribution in the two experiments.

| | Experiment 1 weight per cent | Experiment 2 weight per cent |
|---|---|---|
| $C_4$'s | 23.57 | 33.43 |
| Cyclopentadiene | 20.79 | 3.01 |
| Other $C_5$'s | 12.84 | 9.67 |
| $C_6$'s | 19.60 | 23.47 |
| $C_7$'s and heavier | 23.20 | 30.42 |
| | 100.00 | 100.00 |

From the foregoing many advantages of my invention will be apparent to those skilled in the art. The principal advantage is that the invention provides a simple and effective method for the synthesis of cyclopentadiene from comparatively cheap and readily available materials.

The reaction is endothermic, that is, it requires heat to be supplied in order to continue. Heat may be supplied in any suitable manner as by surrounding the reaction tube chamber with hot combustion gases. In some cases highly superheated steam may be introduced into the reaction zone itself as a source of heat for maintenance of reaction temperature at the desired level. Instead of steam other suitable inert heat carrying gases may be used such as hydrogen, methane or ethane, although these are not nearly so desirable as steam.

The hydrocarbons employed in carrying out the present invention should be free from detectable amounts of sulfur and sulfur compounds, including elemental sulfur, hydrogen sulfide, mercaptans and the like since otherwise the product cyclopentadiene will be objectionably contaminated with sulfur compounds which can be removed either not at all or only with extreme difficulty and at great expense.

I claim:

1. The process of producing cyclopentadiene which comprises continuously introducing propylene into one end of a cylindrical turbulence chamber of relatively large cross-section at a high linear velocity, continuously introducing streams of acetylene at a plurality of points located longitudinally of said chamber, said acetylene streams being injected tangentially of said chamber and at high linear velocity, maintaining vigorous turbulent circulation of the reaction mixture within said chamber, the molar ratio of propylene to total acetylene introduced being at least 9:1, heating said chamber to a temperature of from 1200 to 1500° F., holding said hydrocarbons in said chamber for an average residence time of from 0.3 to 0.75 second, continuously withdrawing the reaction mixture from the end of said chamber opposite the end into which said propylene is introduced, cooling the effluent, and recovering cyclopentadiene therefrom as a product of the process.

2. The process of claim 1 in which the pressure in said chamber is maintained at from atmospheric to 20 atmospheres.

3. The process of claim 1 in which the pressure in said chamber is just sufficiently above atmospheric to cause flow of the reactants and reaction mixture through said chamber.

4. The process of claim 1 wherein there is maintained in the reaction zone steam as a diluent in an amount such as to reduce the partial pressure of the hydrocarbon to not less than one-fourth of an atmosphere.

5. The process of producing cyclopentadiene which comprises continuously introducing propylene into one end of a cylindrical turbulence chamber of relatively large cross-section at a high linear velocity, continuously introducing streams of acetylene at a plurality of points located longitudinally of said chamber, said acetylene streams being injected tangentially of said chamber and at high linear velocity, maintaining vigorous turbulent circulation of the reaction mixture within the feed chamber, the molar ratio of propylene to total acetylene introduced being from 15:1 to 20:1, heating said chamber to a temperature of approximately 1400° F., holding said hydrocarbons in said chamber for an average residence time of 0.5 second, continuously withdrawing the reaction mixture from the end of said chamber opposite the end into which said propylene is introduced, cooling the effluent, and recovering cyclopentadiene therefrom as a product of the process.

FREDERICK E. FREY.

REFERENCES CITED

The following references are of record in the file of this patent:

UNITED STATES PATENTS

| Number | Name | Date |
|---|---|---|
| 1,436,819 | Plauson | Nov. 28, 1922 |
| 1,880,309 | Wulff | Oct. 4, 1932 |
| 1,971,677 | Coxon | Aug. 28, 1934 |
| 2,197,257 | Burk | Apr. 16, 1940 |
| 2,290,211 | Schaad | July 21, 1942 |
| 2,376,426 | Frey | May 22, 1945 |

FOREIGN PATENTS

| Number | Country | Date |
|---|---|---|
| 369,351 | Great Britain | Mar. 24, 1932 |

OTHER REFERENCES

Berthelot, Annales de Chimie et Physique (4), vol. 9, page 466 (1866), and (5), vol. 10, page 186 (1877).